United States Patent [19]
Shannon et al.

[11] Patent Number: 5,885,731
[45] Date of Patent: Mar. 23, 1999

[54] WELDLESS BATTERY USING COVER AS MOLD TO CAST PLATE STRAPS, THROUGH THE PARTITION CONNECTIONS AND TERMINALS

[75] Inventors: Jack K. Shannon; James M. Shannon, both of Racine, Wis.

[73] Assignee: Enersafe Corp., Racine, Wis.

[21] Appl. No.: 841,121

[22] Filed: Apr. 29, 1997

[51] Int. Cl.$^6$ ...................................................... H01M 2/04
[52] U.S. Cl. .......................... 429/175; 429/161; 429/178; 429/181
[58] Field of Search ..................................... 429/175, 181, 429/178, 161; 29/885, 623.2, 623.5; 164/98; 228/207, 223

[56] References Cited

U.S. PATENT DOCUMENTS

| | | |
|---|---|---|
| 3,343,997 | 9/1967 | Tiegel . |
| 3,859,134 | 1/1975 | Shirodker . |
| 4,107,398 | 8/1978 | Lindenberg et al. . |
| 4,509,253 | 4/1985 | Eberle . |
| 5,158,842 | 10/1992 | McHenry . |

FOREIGN PATENT DOCUMENTS

| 2042249 | 9/1980 | United Kingdom . |
|---|---|---|

Primary Examiner—John S. Maples
Attorney, Agent, or Firm—Donald J. Ersler

[57] ABSTRACT

An improved battery design which utilizes the cover of the container as a mold to simultaneously create a plurality of solid cast electrical circuits, including external terminals, all without welded connections. The battery cover includes a plurality of plate strap mold wells or mold wells which receive molten lead. Adjacent plate strap mold wells are separated by a partition wall. An aperture is formed in the partition wall which allows molten lead to flow between adjacent plate strap mold wells and connect thereof. Terminal mold wells have terminal apertures through which molten lead flows to form an external terminal with the aid of a external terminal mold. A meltable sealant material is pre-applied to the plurality of mold wells and which becomes fluid upon introduction of molten lead. Upon cooling, the sealant material prevents migration of electrolyte between mold wells. The sealant material also prevents electrolyte and gasses from leaking out of the juncture between the external terminals and the battery cover. The sealant material further has the advantage of flowing into the fusion junctures between the plate lugs and the plate straps. The plate lugs may also be pre-coated when bright metal clean with a flux to prevent oxidation and a sealant to retain the flux. The flux retained by the sealant inhibits oxidation of the plate lugs. With this innovative method of battery manufacture, the battery is assembled and completely sealed in a matter of seconds.

33 Claims, 5 Drawing Sheets

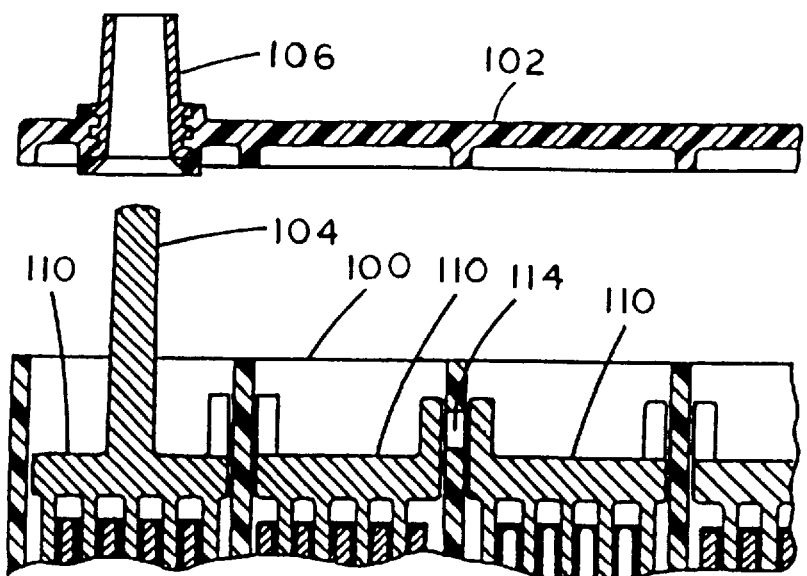
FIG. 2 (PRIOR ART)
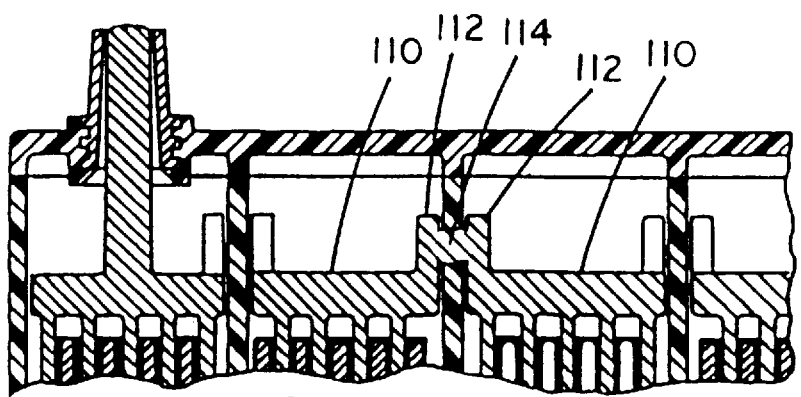
FIG. 3 (PRIOR ART)
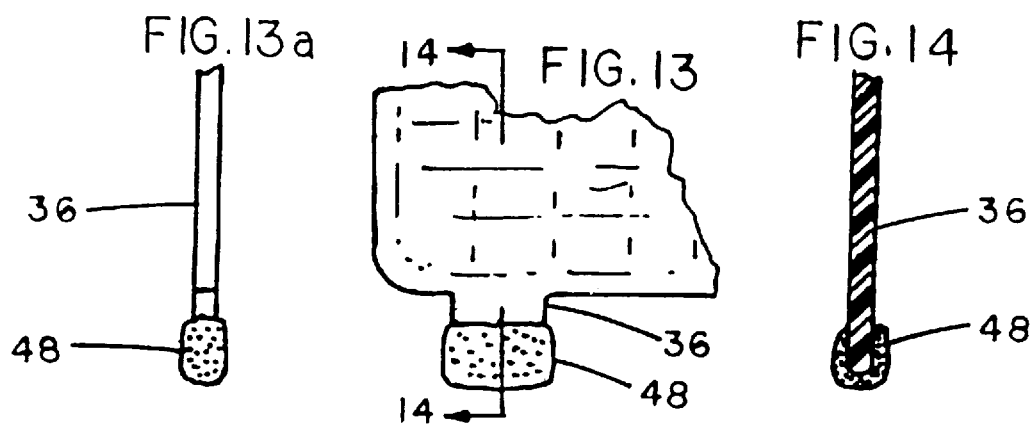

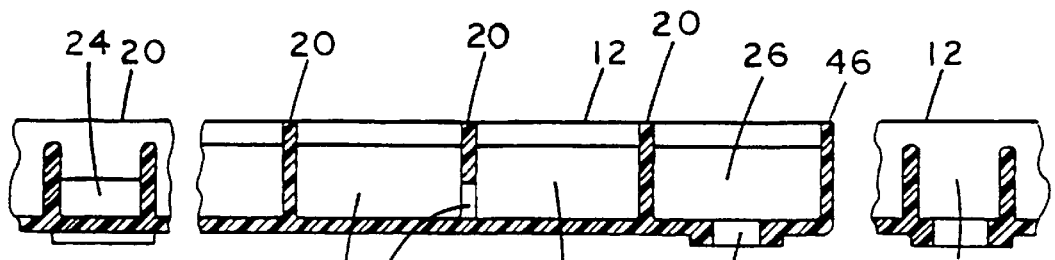
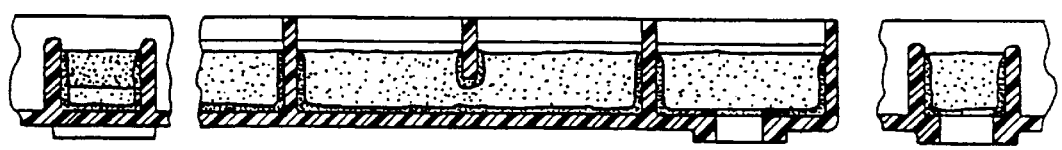
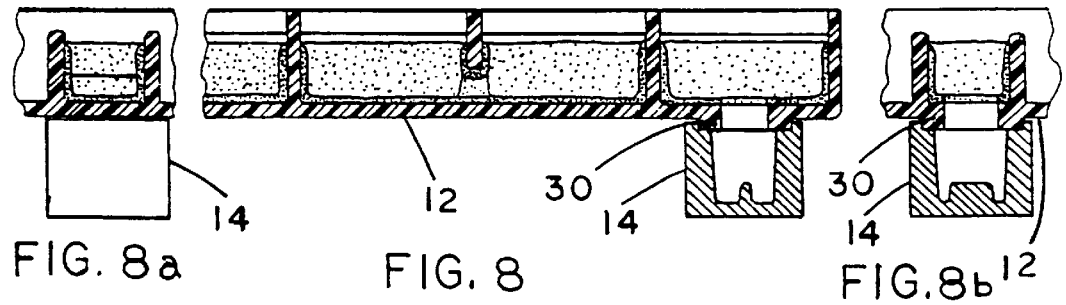
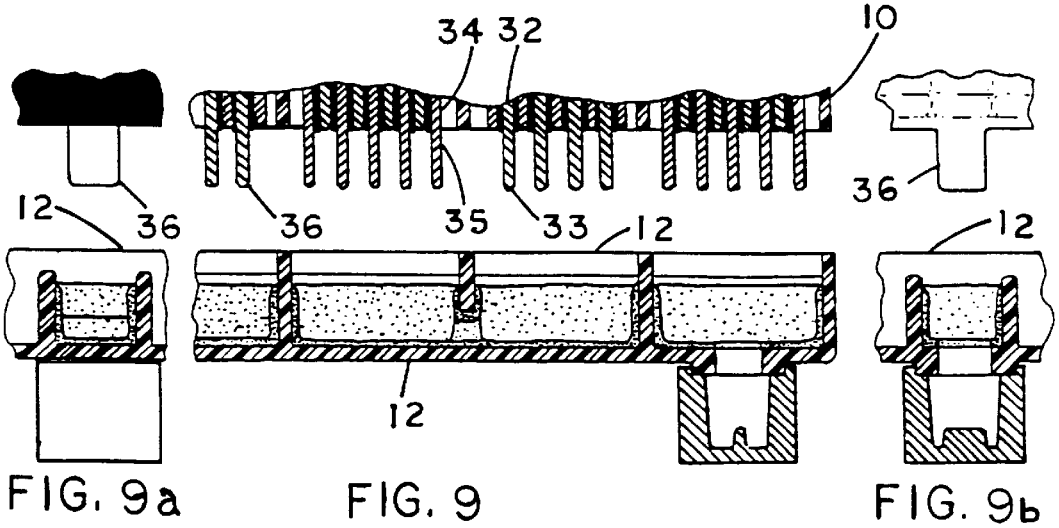

WELDLESS BATTERY USING COVER AS MOLD TO CAST PLATE STRAPS, THROUGH THE PARTITION CONNECTIONS AND TERMINALS

BACKGROUND OF THE INVENTION

1. Field of the Invention

This invention relates to electrochemical cells and specifically to lead acid storage batteries.

2. Discussion of the Prior Art

There are five persistent engineering problems which have plagued the lead/acid storage battery industry since the inception of multi-cell batteries. The first problem has been defective intercell connections. Presently, intercell connections are made by welding together two plate strap upstanding lugs through a hole in a partition of a battery container. This welded connection is commonly known as a "through the partition" connection. One problem with this conventional "through the partition" connection is that the weld is susceptible to breakage. Broken connections will allow electrical arcing. An explosion may occur when electrical arcing ignites hydrogen and oxygen gasses which are naturally generated inside the battery.

Battery explosions are often serious and sometimes lethal. According to National Highway Traffic and Safety Administration statistics, 6,000 battery related injuries are treated annually in hospitals. Currently, a conventionally built 12 volt battery has five internal "through the partition" weld connections plus two external terminal weld connections. All of these weld connections have the potential to break, electrically arc, and cause an explosion.

The second problem relates to the seal at the intercell connections between adjacent plate strap mold wells. A good seal is important to prevent electrolyte from leaking from one cell to another. Electrolyte leakage can cause cells to electrically discharge and become electrically unbalanced.

The third problem of conventionally built batteries is electrolyte leakage in the area of the external terminals. In conventional construction, hollow external terminal bushings are pre-cast of lead and molded into the battery cover. After the battery cover is heat sealed to the battery container, internal posts extending from two end cells in the battery container—one positive and one negative—protrude through the two hollow external terminal bushings in the battery cover. The ends of the internal posts and the pre-cast external terminal bushings are connected together by a welding process. The hollow external terminal bushings molded into the cover are intended to seal the external terminal from electrolyte and gas leakage from the battery. The hollow external terminal bushing does provide some improvement over rubber gaskets, "O" rings, lock nuts, and other means used in the past to prevent electrolyte leakage. However, hollow external terminal bushings, besides being costly, are relatively fragile and depend on a good weld to the internal cell posts and are still prone to gas and electrolyte leakage.

The fourth problem is corrosion at the fusion juncture of the plate lugs to the plate straps. The corrosion is caused by acids and corrosive gasses attacking combinations of lead alloys used in the battery.

The fifth problem is the necessity of brushing plate lugs before entry into the molten plate strap. The brushing removes foreign material such as lead oxide residue left from the plate pasting operation and any lead oxide derived from the natural exposure to the atmosphere. Brushing also creates a bright metal appearance on the plate lug.

Accordingly, there is a clearly felt need in the art to eliminate the bane of explosions due to weld failures. There is a further need to eliminate pre-molded external terminal bushings, pre-molded internal cell posts, and associated welding procedures for making external terminals. There is yet a further need to preclude acids and corrosive gasses from reaching the fusion juncture between the battery plates and straps. There is finally a need to eliminate the need to brush a battery plate plug before insertion into a molten plate strap.

OBJECTS OF THE INVENTION

Accordingly, it is an object of the present invention to provide a battery having no welds in the electrical circuit.

It is a further object of the present invention to provide a battery without intercell connectors or hollow external terminal bushings molded into the battery cover.

It is yet a further object of the present invention to provide a battery which requires no welding machines in it's manufacture.

It is yet a further object of the present invention to provide a poured lead, solid cast electrical circuit which includes plate straps, intercell connections, and external terminal connectors.

It is yet a further object of the present invention to provide a battery where the battery cover and external terminal mold serves as the circuit mold.

It is yet a further object of the present invention to pour the complete electrical circuit of the battery at one time.

It is yet a further object of the present invention to seal the intercell connections from liquid or gas propagation, thus prohibiting electrolyte or gasses from migrating from one adjacent cell to another.

It is yet a further object of the present invention to reduce the number of machines and machine operations required to manufacture batteries.

It is yet a further object of the present invention to seal the external terminals from liquid or gas propagation, thus preventing electrolyte or gasses from migrating out of the battery between the battery cover and external terminals.

It is yet a further object of the present invention to seal the fusion juncture between the plate lugs and battery straps to prevent liquid and gasses from corroding thereof.

It is yet a further object of the present invention to concurrently seal the intercell connections; external terminals; and the plate lugs, and plate strap fusion junctures at the same time by pouring molten lead into the plate strap mold wells of the cover and thus casting the entire electrical circuit of the battery.

It is yet a further object of the invention is to provide a method of manufacturing lead acid storage batteries which overcomes the problems in the prior art.

It is yet a further object of the present invention to provide a safer, lighter and more efficient lead acid storage battery.

It is yet a further object of the present invention to eliminate or greatly reduce the occurrence of explosions in lead acid batteries.

It is yet a further object of the present invention to further reduce the amount of lead used in the manufacture of lead acid storage batteries.

It is yet a further object of the present invention to manufacture a battery in which the plate straps are supported and strengthened by being cast in plate strap mold wells in the plastic cover of the battery.

It is yet a further objection of the present invention to provide a plate lug which does not have to be brushed and fluxed just before insertion into a molten plate strap.

It is finally an object of the present invention to shorten the electrical path in lead acid storage batteries.

SUMMARY OF THE INVENTION

The battery of the present invention includes a plurality of positive battery plates, a plurality of negative battery plates, a battery cover, and a battery container. The battery cover includes a top wall, and a plurality of side walls. The top wall has a top surface and a bottom surface. A plurality of plate strap mold wells or mold wells are formed on the bottom surface of the top wall. Each mold well receives either positive or negative lugs from positive or negative battery plates.

The boundary of each mold well is formed from the bottom surface of the top wall, two partition walls, and two end walls. The boundary of each terminal mold well is formed from the bottom surface of the top wall, two end walls, one side wall, and one partition wall. Preferably, the plurality of mold wells are molded as one unit to assure that all walls are hermetically sealed such that each mold well is isolated from the other mold wells both from liquid as well as gasses. The process of battery assembly dictates that the battery cover and battery container be rotated 180 degrees from normal usage such that the bottom surface of the top wall faces upward. In the rotated position, the plurality of side walls, the plurality of partition walls and the plurality of end walls extend upward from the bottom surface of the top wall. The plurality of partition walls in the battery cover align with a plurality of cell partition walls in the battery container.

The bottom surface of the top wall of the battery cover, the plurality of partition walls and the plurality of side walls form an equal number of positive plate strap mold wells and negative plate strap mold wells. The lugs from the positive battery plates are received by the positive plate strap mold wells and the lugs from the negative battery plates are received by the negative plate strap mold wells.

In a 12 volt battery, there are two terminal plate strap mold wells and five sets of adjacent plate strap mold wells. A partition wall with an aperture formed therethrough separates the adjacent plate strap mold wells. Molten lead is poured into the adjacent plate strap mold wells and thereof flows between each adjacent plate strap mold well through the aperture. When the lead solidifies a solid plate strap is formed in each set of adjacent plate strap mold wells.

The plate straps are created when molten lead is poured into the plate strap mold wells. The plate lugs are inserted into the molten lead. The temperature of the molten lead is between 650 to 1000 degree (F). As the molten lead is poured, thereof flows through the apertures such that the lead in the positive plate strap mold wells becomes integral with the lead in the adjacent negative plate strap mold wells. When the molten lead solidifies, lead in the connected adjacent plate strap mold wells become a contiguous mass of lead. A contiguous mass of lead is stronger than a welded connection and will stand up better to vibration and increase battery life. A negative terminal aperture is created through the top wall of the negative terminal plate strap mold well. A positive terminal aperture is created through the top wall of the positive terminal plate strap mold well.

Preferably, each terminal aperture has a terminal boss which extends upward from the top surface of the top wall. The terminal boss is used to concentrically locate and temporarily seal a external terminal mold. When molten lead is poured into the terminal plate strap mold well, the molten lead flows through the terminal aperture into the external terminal mold. The molten lead fills the external terminal mold, the terminal aperture, and the terminal plate strap mold well to a desired depth to form a plate strap and an external battery terminal which are one contiguous mass.

It is preferred that the molten lead be poured directly into the external terminal mold through the terminal aperture. Pouring the molten lead into the terminal plate strap mold well and allowing the molten lead to flow through the terminal aperture into the external terminal mold risks melting the sealant material in the plastic terminal plate strap mold well. This could cause the lead in the external terminal to be mixed with sealant material.

Of key importance in the invention is a means of positively sealing the space between the lead which shrinks upon solidification and the plate strap mold wells of the cover. Sealing would be concurrent with the lead pouring and would include all plate strap mold wells and apertures. Preferably, the sealing would be accomplished by coating the plate strap mold wells and apertures with a meltable sealant material. Such sealant material could be meltable hot glue, paraffin, or any other substance which simply melts with minimal decomposition. Preferably, the sealant would adhere to the plastic battery cover material and to the lead plate straps.

When the molten lead is poured into the plate strap mold wells, the sealant melts and floats up around the molten lead. When the lead solidifies and shrinks to its final size, a space is left between the lead and the strap plate mold wells, also a space is left between the lead and the apertures. The melted sealant still remaining liquified flows between the plate strap mold wells and the lead, also the melted sealant flows between the lead and the apertures. The solidified sealant material effectively seals and precludes electrolyte or gasses from leaking from one plate strap mold well to an adjacent plate strap mold well. The solidified sealant material also seals the junctures between the lead plate straps and the cover, thus preventing migration of electrolyte and gasses out of the battery.

If sufficient sealant material is placed in the plate strap mold wells, the sealant material will flow around the sides and on top of the molten lead in each plate strap mold well. The sealant material will also settle into the fusion junctures between the plate lugs and the plate straps. The coating of sealant in the fusion junctures will help prevent corrosion therein from electrolyte or deleterious gasses. It is also possible to coat the fusion junctures and plate straps with a sealant in a secondary operation.

A process for manufacturing a battery utilizing the above novel methods may occur in the following manner. Stacked battery plate and separator battery cells are placed in a cell compartment in a battery container. The cells are retained in the battery container. The battery container, with cells in place is rotated 180 degrees so that the plate lugs of the battery plates project downward. The inverted battery container and cells are poised in alignment above the battery cover. The battery cover is also inverted, ready to be sealed to the battery container. The battery cover has plate strap mold wells which have been pre-coated with hot melt sealant. A combination battery cover/container heat sealing platen(s) and lead dispenser moves between the battery cover and container. Edges of the battery cover and battery container to be sealed are heated to a predetermined melting temperature.

At a predetermined temperature, measured portions of 650 to 1000 degree (F) molten lead are dispensed into all the plate strap mold wells of the battery cover and liquefies the hot melt sealant. At the moment the lead is dispensed, the combination battery cover/container heat sealing platen and lead dispenser is moved out from between the battery cover and battery container. In the next moment, the battery cover and battery container are immediately brought together, while concurrently bringing the plate lugs into the molten lead in the plate strap mold wells for joining. The battery cover and battery container are heat sealed together, the plate lugs join the molten strap lead, and the hot melt sealant embeds and seals the plate straps and portions of the plate lugs practically simultaneously. With this innovative method of battery manufacture, the battery circuitry is cast, the battery is assembled and completely sealed in a matter of seconds.

A preferred way to prepare plate lugs is to apply a solution of flux suspended in a sealant. The flux could be azelaic acid and the sealant paraffin. The sealant solution seals the plate lugs from the atmosphere and serves to hold the flux in readiness to wet the plate lugs for fusion to molten plate straps. Concurrently with the insertion of the plate lugs into the molten plate straps, the melted sealant residue solidifies and serves to seal the juncture thereof. An alternative method of plate lug preparation is to first coat the plate lug with a flux such as azelaic acid and then further coat the plate lugs with a sealant such as paraffin. Either coating process may be preformed at any time the plate lugs are clean and relatively free of lead oxide. Either method may be used just after the plate lugs have been cast, thus avoiding the need to brush at a later time when it may not be so easily or conveniently done.

BRIEF DESCRIPTION OF THE DRAWINGS

FIG. 2 is a partial cross sectional view of a external terminal extending from a battery container and a battery cover with a terminal bushing from a prior art battery before assembly;

FIG. 3 is a partial cross sectional view of a external terminal extending from a battery container and a battery cover with a terminal bushing from a prior art battery after assembly;

FIG. 6 is a cross sectional view of a battery cover in accordance with the present invention;

FIG. 6a is a cross sectional view of an aperture of a battery cover in accordance with the present invention;

FIG. 6b is a cross sectional view of a terminal aperture of a battery cover in accordance with the present invention;

FIG. 7 is a cross sectional view of a battery cover with all the plate strap mold wells coated with a sealant material in accordance with the present invention;

FIG. 7a is a cross sectional view of an aperture of a battery cover coated with a sealant material in accordance with the present invention;

FIG. 7b is a cross sectional view of a terminal aperture of a battery cover coated with a sealant material in accordance with the present invention;

FIG. 8 is a cross sectional view of a battery cover with a external terminal mold attached to a terminal boss in accordance with the present invention;

FIG. 8a is a cross sectional view of an aperture of a battery cover with a external terminal mold attached to a terminal boss in accordance with the present invention;

FIG. 8b is a cross sectional view of a terminal aperture of a battery cover with a external terminal mold attached to a terminal boss in accordance with the present invention;

FIG. 9 is a partial cross sectional view of a battery container disposed above the battery cover before assembly in accordance with the present invention;

FIG. 9a is a cross sectional view of a plate lug disposed above a plate strap mold well before assembly in accordance with the present invention;

FIG. 9b is a cross sectional view of a plate lug disposed above a terminal plate strap mold well before assembly in accordance with the present invention;

FIG. 13 is a front view of a plate lug which has been coated with a sealant solution in accordance with the present invention;

FIG. 13a is an end view of a plate lug which has been coated with a sealant solution in accordance with the present invention; and FIG. 14 is a cross-sectional view of a plate lug which has been coated with a sealant solution in accordance with the present invention.

DETAILED DESCRIPTION OF THE PREFERRED EMBODIMENTS

Figure 1:
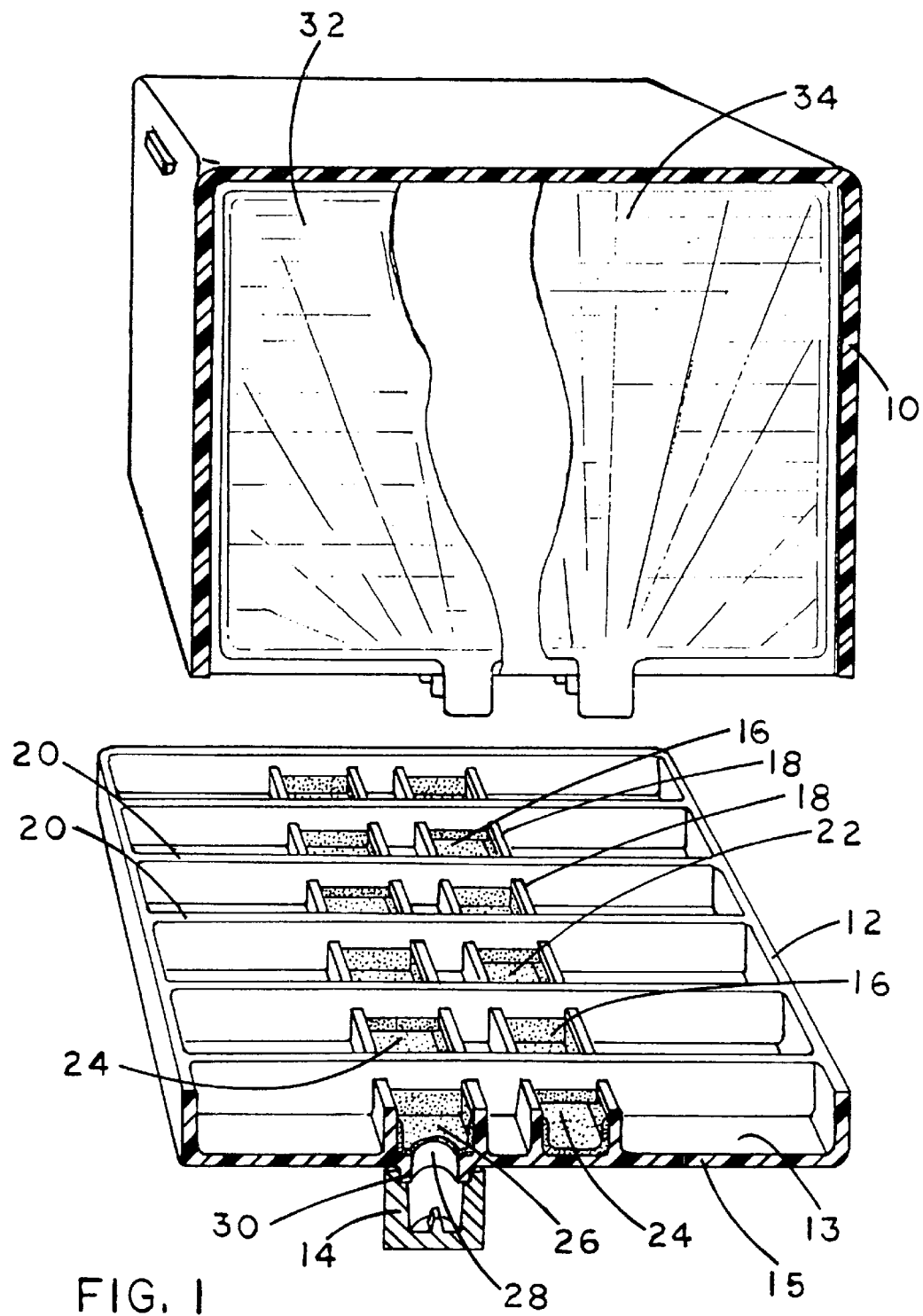
FIG. 1 is a perspective cross sectional detail view of the battery container disposed above the battery cover in accordance with the present invention.

With reference now to the drawings, and particularly to FIG. 1, there is shown a perspective cross sectional detail view of a battery container 10 disposed above a battery cover 12. A external terminal mold 14 is attached to the battery cover 12. The battery cover 12 is divided into a plurality of plate strap mold wells 16 by a plurality of end walls 18 and a plurality of partition walls 20 which extend upward from the bottom surface 13 of the top wall 15. The plate strap mold wells 16 receive molten lead. The battery cover 12 is inverted to receive molten lead which will form external terminals and a solid cast electrical circuit. The plurality of plate strap mold wells 16 have been coated with a hot melt type sealant 22. There is an aperture 24 which is formed in each partition wall 20 to connect adjacent plate strap mold wells together. The aperture 24 is also coated with sealant material 22. The aperture 24 provides a means for molten lead in adjacent plate strap mold wells 16 to form a solid plate strap, thus connecting the cells electrically, in series.

At each end of the battery cover 12 is a terminal plate strap mold well 26. The plate strap and a external terminal are formed as one solid piece when molten lead is poured into the terminal plate strap mold well 26. A terminal aperture 28 allows lead poured into the terminal plate strap mold well 26 to flow into the external terminal mold 14. One external terminal is positive and the other negative. An upstanding boss 30 locates and temporarily holds the external terminal mold 14. A battery container 10 contains a plurality of positive battery plates 32 and a plurality of negative battery plates 34. The battery container 10 is disposed to facilitate assembly with the battery cover 12.

FIG. 2 shows a partial cross sectional view of a conventional internal terminal post 104 extending from a battery plate strap 110 and a battery cover 102 with a terminal bushing 106 from a prior art battery before assembly. FIG. 3 shows a partial cross sectional view of the internal terminal post 104 for welding to the terminal bushing 106. Two adjacent plate straps 110 are electrically connected by squeezing and welding the plate strap lugs 112 of each adjacent plate strap 110 together. The lead from each plate strap lug 112 welds together through an aperture 114 to form a connection between adjacent plate straps 110. The present invention eliminates the terminal bushing 106, and the plate strap lugs 112, thus eliminating the squeezing and welding of the plate strap lugs 112. The present invention also lessens the manufacturing steps, reduces material costs, and improves the reliability of all intercell and terminal connections.

Figure 4:
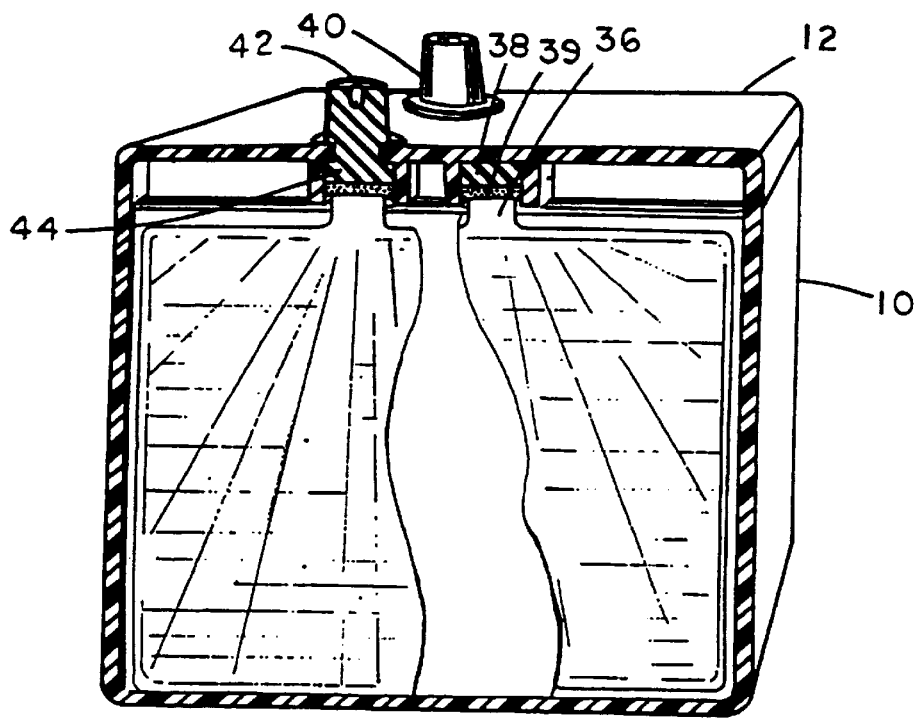
FIG. 4 is a cross sectional perspective view of an assembled battery in accordance with the present invention.

FIG. 4 shows a cross sectional perspective view of our novel assembled battery. A plate lug 36 is securely fused with and retained in a plate strap 38. A positive external terminal 40 extends upward from the battery cover 12. A negative external terminal 42 is a solid piece of a terminal plate strap 44. Sealant material 39 protects the juncture between the plate lug 36 and the plate strap 38.

Figure 5:
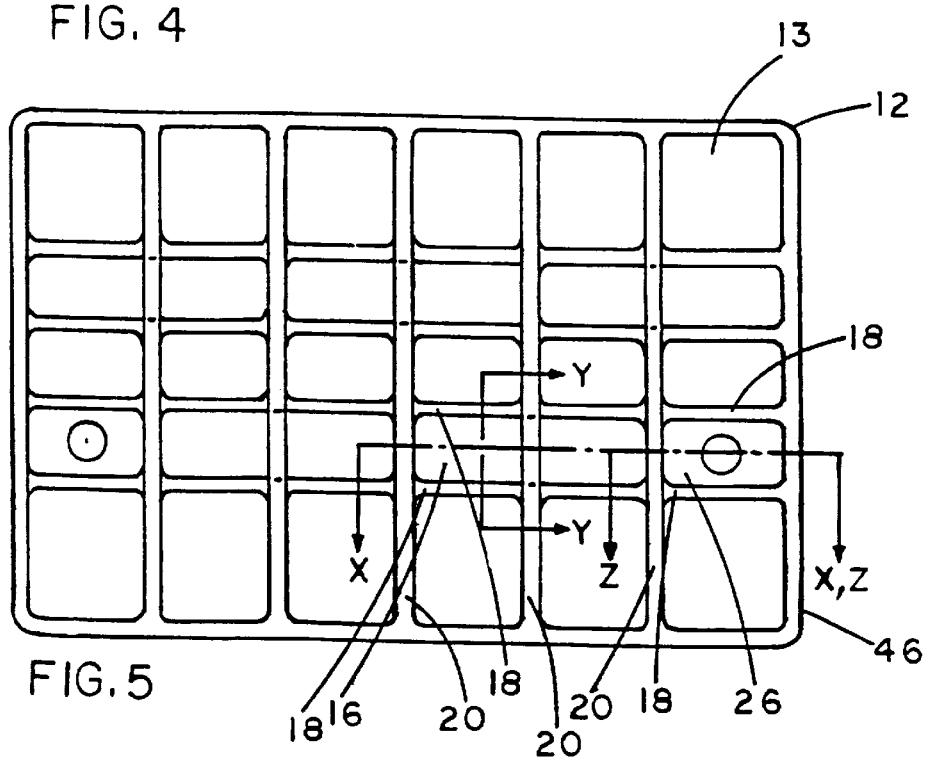
FIG. 5 is a plan view of the bottom surface of a battery cover in accordance with the present invention.
Figures 10, 10A, 10B:
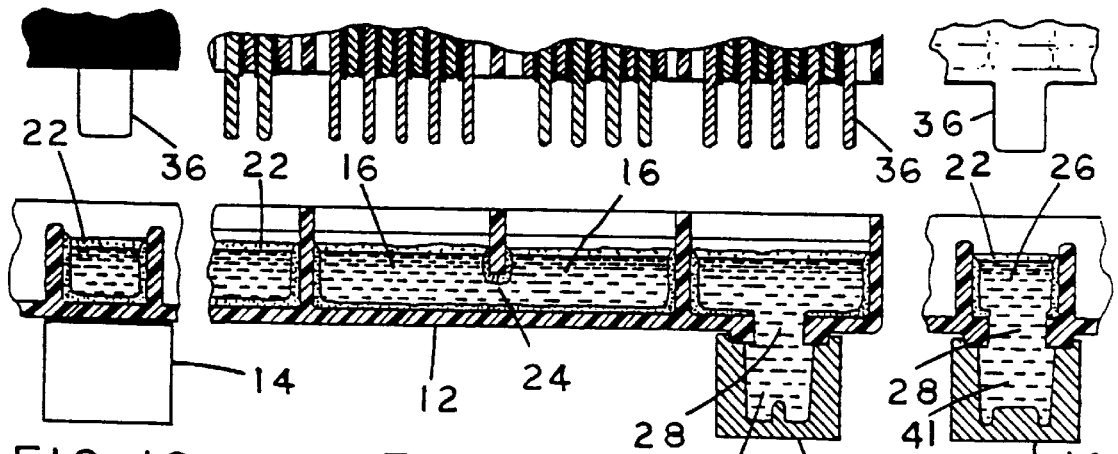
FIG. 10 is a partial cross sectional view of a battery container disposed above the battery cover after lead has been poured into the plate strap mold wells in accordance with the present invention.
FIG. 10a is a cross sectional view of a plate lug disposed above a plate strap mold well after lead has been poured into the plate strap mold well in accordance with the present invention.
FIG. 10b is a cross sectional view of a battery lug disposed above a terminal plate strap mold well after lead has been poured into the terminal plate strap mold well in accordance with the present invention.
Figures 11, 11A, 11B:
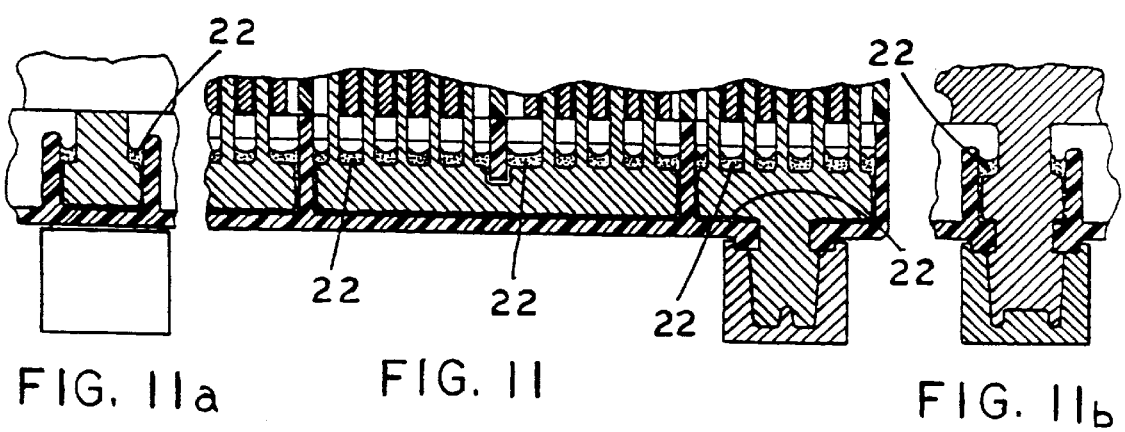
FIG. 11 is a partial cross sectional view of a battery container assembled to a battery cover in accordance with the present invention.
FIG. 11a is a cross sectional view of a plate lug retained by solidified lead in a battery cover in accordance with the present invention.
FIG. 11b is a cross sectional view of a plate lug retained by solidified lead in a battery cover in accordance with the present invention.
Figure 12:
FIG. 12 is a partial side view of an assembled battery in accordance with the present invention.

FIG. 5 shows a plan view of the bottom surface 13 of the battery cover 12. Each plate strap mold well 16 is formed by two end walls 18 and two partition walls 20. Each terminal plate strap mold well 26 is formed by two end walls 18, the partition wall 20, and a side wall 46. The plan view of the battery cover 12 is used to show the section lines for FIGS. 6–11, 6a–11a, and 6b–11b.

FIGS. 6, 6a, and 6b show cross sectional views of the battery cover 12 with sections taken as shown in FIG. 5. A section is cut through the partition wall 20 to show the aperture 24 in FIG. 6a. A section is cut through three partition walls 20 and one side wall 46 to show two adjacent plate strap mold wells 16 which are connected with the aperture 24 in FIG. 6. A section is cut through the partition wall 20 and the side wall 46 to show a terminal plate strap mold well 26 and a terminal aperture 28 in FIG. 6b.

FIGS. 7, 7a, and 7b are the same sections as FIGS. 6, 6a, and 6b, respectively. The plate strap mold wells and apertures are coated with a sealant material in FIGS. 7, 7a, and 7b.

FIGS. 8, 8a, and 8b are the same sections as FIGS. 6, 6a, and 6b, respectively. The external terminal mold 14 is located and temporarily retained by the terminal boss 30 in FIGS. 8, 8a, and 8b.

FIGS. 9, 9a, and 9b are the same sections as FIGS. 6, 6a, and 6b, respectively. A negative lug 35 extends from a negative battery plate 34 and a positive lug 33 extends from a positive battery plate 32 The plurality of plate lugs 36 are shown to better illustrate assembly of the battery cover 12 to the battery container 10.

FIG. 10, 10a, 10b, 11, 11a, and 11b are the same sections as those shown in FIGS. 9, 9a, and 9b, respectively. Molten lead is poured into the adjacent plate strap mold wells 16 and the terminal plate strap mold well 26. Molten lead flows through one plate strap mold well 16 into the adjacent plate strap mold well 16 through the aperture 24. Molten lead flows through the terminal aperture 28 into the external terminal mold 14 to form an external terminal 41. The external terminal mold 14 is removed after the lead solidifies. While a round tapered style external terminal is shown, virtually any style of external terminal can be produced by modifying the external terminal mold 14.

Before and during the time when the lead is being poured, the top edges of the battery cover 12 and the battery container 10 are melted by a combination battery cover/container heat sealing platen and lead dispenser. The molten lead causes the sealant material to melt, some of the sealant material can flow above the molten lead, and settle on top of the plate straps. The remaining sealant material fills in the space between the plate strap mold wells and the lead plate straps which have shrunk upon solidification. The connection between adjacent plate straps is also sealed and prevents electrolyte from seeping from one adjacent plate strap mold well 16 to another. In the terminal plate straps 26, the sealant material 22 prevents electrolyte from migrating out of the battery cover 12 through the terminal aperture 28. The sealant material 22 which flowed on top of the plate straps protects the fusion junctures between the plurality of plate lugs 36 and the plurality of plate straps from corrosion. The sealant can completely enclose the sixth side of the plate strap by sealing and securing the plate straps in the plate strap mold well.

FIG. 13, 13a, and 14 show a plate lug 36 which has been coated with a sealant solution 48. A preferred way to prepare the plate lug 36 is to apply a solution of flux suspended in a sealant solution 48. The flux could be azelaic acid and the sealant paraffin. The sealant solution 48 seals the plate lug 36 from the atmosphere and serves to hold the flux in readiness to wet the plate lug 36 for fusion to the molten plate strap. Concurrently with the insertion of the plate lug 36 into the molten plate strap, the melted sealant solution 48 residue solidifies and serves to seal the juncture thereof.

An alternative method of plate lug preparation is to first coat the plate lug 36 with a flux such as azelaic acid and then further coat the plate lug 36 with a sealant such as paraffin. Either coating process may be preformed at any time the plate lug 36 is clean and relatively free of lead oxide.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A battery having a solid plate strap connecting negative battery plates and positive battery plates comprising:

a battery container having at least two battery cell compartments, each said battery cell compartment containing a plurality of negative battery plates and a plurality of positive battery plates; and a battery cover having at least one set of adjacent plate strap mold wells, said at least one set of adjacent plate strap mold wells being separated by a partition wall, said partition wall having an aperture therethrough which connects each adjacent mold well, said adjacent plate strap mold wells receiving a volume of molten lead, said volume of molten lead becoming a contiguous mass in said at least one set of adjacent Plate strap mold wells when said volume of lead solidifies.

2. The battery having a solid plate strap connecting negative battery plates and positive battery plates of claim 1, wherein:

said at least one set of adjacent plate strap mold wells being integrally molded as part of said battery cover.

3. The battery having a solid plate strap connecting negative battery plates and positive battery plates of claim 1, wherein:

said at least two battery cell compartments being molded as an integral part of said battery container.

4. The battery having a solid plate strap connecting negative battery plates and positive battery plates of claim 1, wherein:

each said negative battery plate having a negative lug and each said positive battery plate having a positive lug, said negative lugs and said positive lugs being inserted into said volume of molten lead contained in said at least one set of adjacent plate strap mold wells.

5. The battery having a solid plate strap connecting negative battery plates and positive battery plates of claim 4, wherein:

said volume of molten lead temperature being 650 to 1000 degrees Fahrenheit.

6. The battery having a solid plate strap connecting negative battery plates and positive battery plates of claim 1, further comprising:

a volume of sealant material being applied to said at least one set of adjacent plate strap mold wells and said aperture before said volume of molten lead is poured into said at least one set of adjacent plate strap mold wells, wherein said volume of sealant material melting and providing a seal between and also affixing said contiguous mass of lead and said battery cover.

7. The battery having a solid plate strap connecting negative battery plates and positive battery plates of claim 6, wherein:

a sufficient volume of sealant material being applied to said at least one set of adjacent plate strap mold wells such that said sealant material rises out of said at least one set of adjacent plate strap mold wells and on top of said volume of molten lead;

each said negative battery plate having a negative lug and each said positive battery plate having a positive lug; and said sealant material solidifying and sealing the juncture between said contiguous mass of lead and said negative lugs, said sealant material solidifying and sealing the juncture between said contiguous mass of lead and said positive lugs.

8. The battery having a solid plate strap connecting negative battery plates and positive battery plates of claim 7, wherein:

said sealant material protecting the juncture between said contiguous mass of lead and negative lugs from corrosive gasses and electrolyte, said sealant material protecting the juncture between said contiguous mass of lead and said positive lugs from corrosive gasses and electrolyte.

9. The battery having a solid plate strap connecting negative battery plates and positive battery plates of claim 1, further comprising:

said battery cover having a positive terminal mold well, and a negative terminal mold well, a positive terminal aperture being formed through said positive terminal mold well, a negative terminal aperture being formed through said negative terminal mold well, a negative terminal plate strap and a negative external terminal being formed as one contiguous mass of lead, a positive terminal plate strap and a positive external terminal being formed has one contiguous mass of lead.

10. The battery having a solid plate strap connecting negative battery plates and positive battery plates of claim 9, further comprising:

said negative terminal plate strap and said negative external terminal being formed as one contiguous mass of lead when a volume of molten lead is poured directly into said negative external terminal mold through said negative terminal aperture, said positive terminal plate strap and said positive external terminal being formed as one contiguous mass of lead when a volume of molten lead is poured directly into said positive external terminal mold through said positive terminal aperture.

11. The battery having a solid plate strap connecting negative battery plates and positive battery plates of claim 1, wherein:

a mating edge of said battery container and a mating edge of said battery cover being melted with a platen and lead dispenser while a volume of molten lead is poured into all plate strap mold wells in said battery cover, said platen and lead dispenser being withdrawn from between said battery cover and said battery container, wherein a solid electrical circuit being cast with said negative battery plates and said positive battery plates being fused therein, said battery cover and said battery container being hermetically sealed, and said battery being assembled concurrently.

12. A battery having an external terminal and a terminal plate strap as one contiguous mass comprising:

a battery container having at least one battery cell compartment, each said battery cell compartment containing a plurality of negative battery plates and a plurality of positive battery plates;

a battery cover having a top wall with a top surface and a bottom surface, a positive terminal plate strap mold well and a negative terminal plate strap mold well being formed in the bottom surface of said battery cover, a positive terminal aperture being formed through said top wall, a negative terminal aperture being formed through said top wall, said positive terminal plate strap mold well receiving a volume of molten lead to form an external positive terminal and a plate strap, said negative terminal plate strap mold well receiving said volume of molten lead to form an external negative terminal and a plate strap.

13. The battery having an external terminal and a terminal plate strap as one contiguous mass of claim 12, further comprising:

a positive terminal boss being formed in said top surface under said positive terminal mold well, a negative terminal boss being formed in said top surface under said negative terminal mold well, a positive external terminal mold being located and retained by said positive terminal boss, a negative external terminal mold being located and retained by said negative terminal boss.

14. The battery having an external terminal and a terminal plate strap as one contiguous mass of claim 13, wherein:
said positive terminal strap and said positive external terminal becoming a contiguous mass, said negative terminal strap and said negative external terminal becoming a contiguous mass.

15. The battery having an external terminal and a terminal plate strap as one contiguous mass of claim 14, wherein:
said positive terminal strap and said positive external terminal becoming a contiguous mass when said volume of molten lead is poured directly into said positive external terminal mold through said positive terminal aperture, said negative terminal strap and said negative external terminal becoming a contiguous mass when said volume of molten lead is poured directly into said negative external terminal mold through said negative terminal aperture.

16. The battery having an external terminal and a terminal plate strap as one contiguous mass of claim 14, wherein:
said positive external terminal mold and said negative external terminal mold being removed when said volume of molten lead solidifies.

17. The battery having an external terminal and a terminal plate strap as one contiguous mass of claim 12, wherein:
said positive terminal mold well and said negative terminal mold well being integrally molded as part of said battery cover.

18. The battery having an external terminal and a terminal plate strap as one contiguous mass of claim 12 wherein:
said at least one battery cell compartment being molded as an integral part of said battery container.

19. The battery having an external terminal and a terminal plate strap as one contiguous mass of claim 14, wherein:
each said negative battery plate having a negative lug and each said positive battery plate having a positive lug, said negative lugs and said positive lugs being inserted into said volume of molten lead in said negative terminal mold well and said positive terminal mold well, respectively.

20. The battery having an external terminal and a terminal plate strap as one contiguous mass of claim 19, wherein:
said volume of molten lead temperature being 650 to 1000 degrees Fahrenheit.

21. The battery having an external terminal and a terminal plate strap as one contiguous mass of claim 14, wherein:
a volume of sealant material being applied to said positive terminal mold well and said negative terminal mold well before said volume of molten lead is poured into said positive terminal mold well and said negative terminal mold well, wherein said volume of sealant material melting and providing a seal between said contiguous mass of lead and said battery cover.

22. The battery having an external terminal and a terminal plate strap as one contiguous mass of claim 21, wherein:
a sufficient volume of sealant material being applied to said positive terminal mold well and said negative terminal mold well such that said sealant material rises out of said negative terminal mold well and said positive terminal mold well and on top of said volume of molten lead;
each said negative battery late having a negative lug and each said positive battery plate having a positive lug; and
said sealant material solidifying and sealing the juncture between said contiguous mass of lead and said negative lugs, said sealant material solidifying and sealing the juncture between said contiguous mass of lead and said positive lugs.

23. The battery having an external terminal and a terminal plate strap as one contiguous mass of claim 22, wherein:
said sealant material protecting the juncture between said contiguous mass of lead and said negative lugs from corrosive gasses and electrolyte, said sealant material protecting the juncture between said contiguous mass of lead and said positive lugs from corrosive gasses and electrolyte.

24. The battery having an external terminal and a terminal plate strap as one contiguous mass of claim 12, wherein:
said battery cover having at least one set of adjacent plate strap mold wells, said at least one set of adjacent plate strap mold wells being one contiguous mass of lead, a negative lug extending from said negative battery plate and a positive lug extending from said positive battery plate, said positive lugs and said negative lugs being inserted into said contiguous mass of lead while thereof is still molten.

25. The battery having an external terminal and a terminal plate strap as one contiguous mass of claim 14, wherein:
a mating edge of said battery container and a mating edge of said battery cover being both melted with a platen and lead dispenser while a volume of molten lead is poured into all plate strap mold wells in said battery cover, said platen and lead dispenser being withdrawn from between said battery cover and said battery container, wherein a solid electrical circuit being cast with said negative battery plates and said positive battery plates being fused therein, said battery cover and said battery container being hermetically sealed, and said battery being assembled concurrently.

26. A battery having a solid plate strap connecting negative battery plates and positive battery plates comprising:
a battery container having at least two battery cell compartments, each said battery cell compartment containing a plurality of negative battery plates and a plurality of positive battery plates; and
a battery cover having at least one set of adjacent plate strap mold wells, said at least one set of adjacent plate strap mold wells being separated by a partition wall, said partition wall having an aperture therethrough which connects each adjacent mold well, said adjacent plate strap mold wells receiving a volume of molten lead, at least one plate lug of a plate strap being inserted into each said plate strap mold well while said volume of lead is still molten, said volume of molten lead becoming a contiguous mass in said at least one set of adjacent plate strap mold wells when said volume of lead solidifies.

27. The battery having a solid plate strap connecting negative battery plates and positive battery plates of claim 26, wherein:
said at least one set of adjacent plate strap mold wells being integrally molded as part of said battery cover.

28. The battery having a solid plate strap connecting negative battery plates and positive battery plates of claim 26, wherein:
said at least two battery cell compartments being molded as an integral part of said battery container.

29. The battery having a solid plate strap connecting negative battery plates and positive battery plates of claim 26, further comprising:

said battery cover having a positive terminal mold well, and a negative terminal mold well, a positive terminal aperture being formed through said positive terminal mold well, a negative terminal aperture being formed through said negative terminal mold well, a negative terminal plate strap and a negative external terminal being formed as one contiguous mass of lead, a positive terminal plate strap and a positive external terminal being formed as one contiguous mass of lead.

30. A battery having an external terminal and a terminal plate strap as one contiguous mass comprising:

a battery container having at least one battery cell compartment, each said battery cell compartment containing a plurality of negative battery plates and a plurality of positive battery plates;

a battery cover having a top wall with a top surface and a bottom surface, a positive terminal plate strap mold well and a negative terminal plate strap mold well being formed in the bottom surface of said battery cover, a positive terminal aperture being formed through said top wall, a negative terminal aperture being formed through said top wall; and an attached positive external terminal mold and said positive mold well receiving a volume of molten lead to form an external positive terminal and a positive plate strap upon solidification, at least one plate lug of a plate strap being inserted into said positive terminal mold plate strap well while said volume of lead is still molten, an attached negative external terminal mold and said negative mold well, receiving a volume of molten lead to form an external negative terminal and a negative plate strap upon solidification, at least one plate lug of a plate strap being inserted into said negative terminal mold plate strap well while said volume of lead is still molten.

31. The battery having an external terminal and a terminal plate strap as one contiguous mass of claim 30, wherein:

said positive terminal mold well and said negative terminal mold well being integrally molded as part of said battery cover.

32. The battery having an external terminal and a terminal plate strap as one contiguous mass of claim 30, wherein:

said at least one battery cell compartment being molded as an integral part of said battery container.

33. The battery having an external terminal and a terminal plate strap as one contiguous mass of claim 30, wherein:

said battery cover having at least one set of adjacent plate strap mold wells, said at least one set of adjacent plate strap mold wells being one contiguous mass of lead, a negative lug extending from said negative battery plate and a positive lug extending from said positive battery plate, said positive lugs and said negative lugs being inserted into said contiguous mass of lead while thereof is still molten.

* * * * *